Inventor
Paul Weien
By Stevens, Davis, Miller & Mosher
Attorneys

Feb. 22, 1966 P. WEIEN 3,236,025
PAPER DISPENSER FOR MOLDING MACHINE
Original Filed Dec. 8, 1961 7 Sheets-Sheet 5

Inventor
Paul Weien

By
Stevens, Davis, Miller & Mosher
Attorneys

Feb. 22, 1966 P. WEIEN 3,236,025
PAPER DISPENSER FOR MOLDING MACHINE
Original Filed Dec. 8, 1961 7 Sheets-Sheet 6

INVENTOR
*Paul Weien*

BY
*Stevens, Davis, Miller & Mosher*
ATTORNEYS

Feb. 22, 1966 P. WEIEN 3,236,025
PAPER DISPENSER FOR MOLDING MACHINE
Original Filed Dec. 8, 1961 7 Sheets-Sheet 7

Fig. 12.

INVENTOR
Paul Weien

BY
Stevens, Davis, Miller & Mosher
ATTORNEYS 3,236,025
PAPER DISPENSER FOR MOLDING MACHINE
Paul Weien, Marietta, Pa.
Continuation of application Ser. No. 158,085, Dec. 8, 1961. This application June 29, 1964, Ser. No. 378,813
6 Claims. (Cl. 53—235)

This application is a continuation of my application Serial No. 158,085, filed December 8, 1961, now abandoned. That application is a continuation-in-part of my copending application Serial No. 787,999, filed January 20, 1959, now Patent No. 3,060,493.

The present invention relates to a molding machine and, more particularly, to a paper dispenser adapted to underleave the products of the molding machine with pieces of paper. Thus, if the molded products are stacked one upon the other, the papers will prevent the products from adhering to one another, or, stated conversely, will permit an ease of separation of the products from each other.

The paper dispenser is associated with a molding machine as will hereinafter appear. In order to provide proper antecedent basis for the structure of the paper dispenser, the overall molding machine will be described in detail.

The molding machine set forth herein is adapted to receive a quantity of material, such as ground meat, or other moldable material and to form patties therefrom of a predetermined shape and weight. As will appear hereinafter, the molding machine operates in such a manner as to produce the shaped articles of food or other moldable material much more efficiently and much quicker than has been effected heretofore on machines designed for the same general purpose. Furthermore, the machine employed in the present invention is designed in such a manner that the entire operating cycle can be performed without requiring direct contact at any time with the human operating element.

Briefly stated, the molding machine involves a cylindrically shaped hopper rotatable on a vertical axis relative to a stationary and horizontal base plate. The base plate encloses the bottom of the hopper but has an opening therein. A stationary pitched blade positioned within the hopper above the base plate will direct the material in the hopper towards the opening in the base plate as the material is moved by frictional contact with the sides of the rotating hopper.

A horizontal turntable having a plurality of vertically-arranged cylindrical openings therein is rotatably mounted to one side of the base plate such that, as each cylindrical opening passes beneath the base plate it comes into registry with the opening in the base plate. (Although the openings in the turntable have been referred to above and will be described hereinafter as "cylindrical," it should be understood that the holes can be of any other desired and predetermined shape). A piston is slidably receive within each cylindrical hole, and each piston is mounted on a piston rod which projects downwardly beneath the turntable. The pistons move up and down within the cylindrical holes by means of a cam track, against which the lower ends of the piston rods are resiliently urged. As the turntable rotates, the pistons will move in accordance with the configuration of the cam track; thus, when each cylindrical opening of the turntable is positioned directly below the opening in the base plate of the hopper, its corresponding piston is in its lowermost position such that the space between the top of the piston and the bottom of the hopper will permit the formation of a narrow cylindrical block (or patty) of material in this space. When the turntable moves to a position away from the base plate of the hopper, the piston will be moved upwardly such that its upper end will be level with the top of the turntable.

As the piston rods move from the upper cam track to the lower cam track in the direction of the opening in the base plate, these piston rods pass over an inclined cam segment which connects the two cam tracks. This interconnecting cam segment is adjustble with respect to the two cam tracks such that the pistons can be caused to commence their downward inclined movement towards the lower cam track at a later or earlier time as desired. Thus, if the machine is operating so as to produce relatively thin patties, it is desirable to advance the inclined cam segment so that the pistons start their downward movement at a later time; if, on the other hand, a thicker patty or cake is being produced by the machine, it is desirable to move the inclined cam segment away from the opening in the base plate so that the pistons will start their downward movement at an earlier time. In this way, the time cycle for filling the spaces above the pistons is variable. It can be stated as a general proposition, for patties of a relatively constant density, that the duration of the filling cycle will increase as the thickness of the patty increases. Stated differently, the adjustable nature of the inclined cam segment also permits a control of the density of the patty.

Another rotatable supporting member is positioned above and to one side of the turntable. The second rotatable support includes therein a plurality of reciprocating impaling elements which are also operated by cams. For example, the vertical rods upon which the impaling elements are mounted are urged upwardly against a circumferential cam track; the cam track is so shaped that the impaling elements are adapted to pass downwardly through perforations or apertures in the rotatable supporting member as the latter is rotated. Also, movement of these impaling elements through their respective holes is in synchronism with the rotation of the turntable Thus, as the turntable moves a patty from beneath the fixed plate of the hopper and upwardly into a position which is level with the top of the turntable, an impaling element (or group of the same) on the second rotatable support is moved downwardly so as to impale this patty and slide the same from the turntable. The patty is maintained in position on the impaling element and is not released therefrom until some time subsequent. As the rotatable support continues to move, the impaling element is elevated thereafter and the impaling elements are withdrawn from the patty so as to permit the same to be dropped at some convenient location.

In the embodiment of the present invention, as shown in the drawings, the patties will be appropriately dropped onto a horizontal belt conveyor. However, as the patties are carried by the impaling elements towards the horizontal conveyor they pass over a paper dispenser in such a manner as to underleave each patty with a piece of paper.

The paper dispenser of the present invention is disclosed in the form of two embodiments; in one embodiment the paper dispenser is moved upwardly towards the patty as the latter passes by; in the other embodiment the paper dispenser is relatively stationary while the impaling element moves the patty downwardly into engagement with the paper dispenser. At any event, the relative motion of the impaling elements and the paper dispenser towards each other is responsive to circular movement of the impaling elements over the paper dispenser. The frictional engagement between the bottom surface of the patty and the upper sheet of paper on the paper dispenser is sufficient to tear this top sheet from the pile or pack of papers.

Thus, an important object of the present invention is to provide a machine of the type referred to above which is entirely automatic in operation and which will permit the formation of molded products in a manner much more efficient and much quicker than has heretofore been effected in machines designed for the same general purpose.

However, the principal object of the present invention is to provide an automatic paper dispenser for use in connection with a molding machine, for example, of the type referred to above and described herein.

Other and further objects and advantageous features of the present invention will hereinafter more fully appear in connection with a detailed description of the drawings wherein.

*The molding machine*

Figure 1:
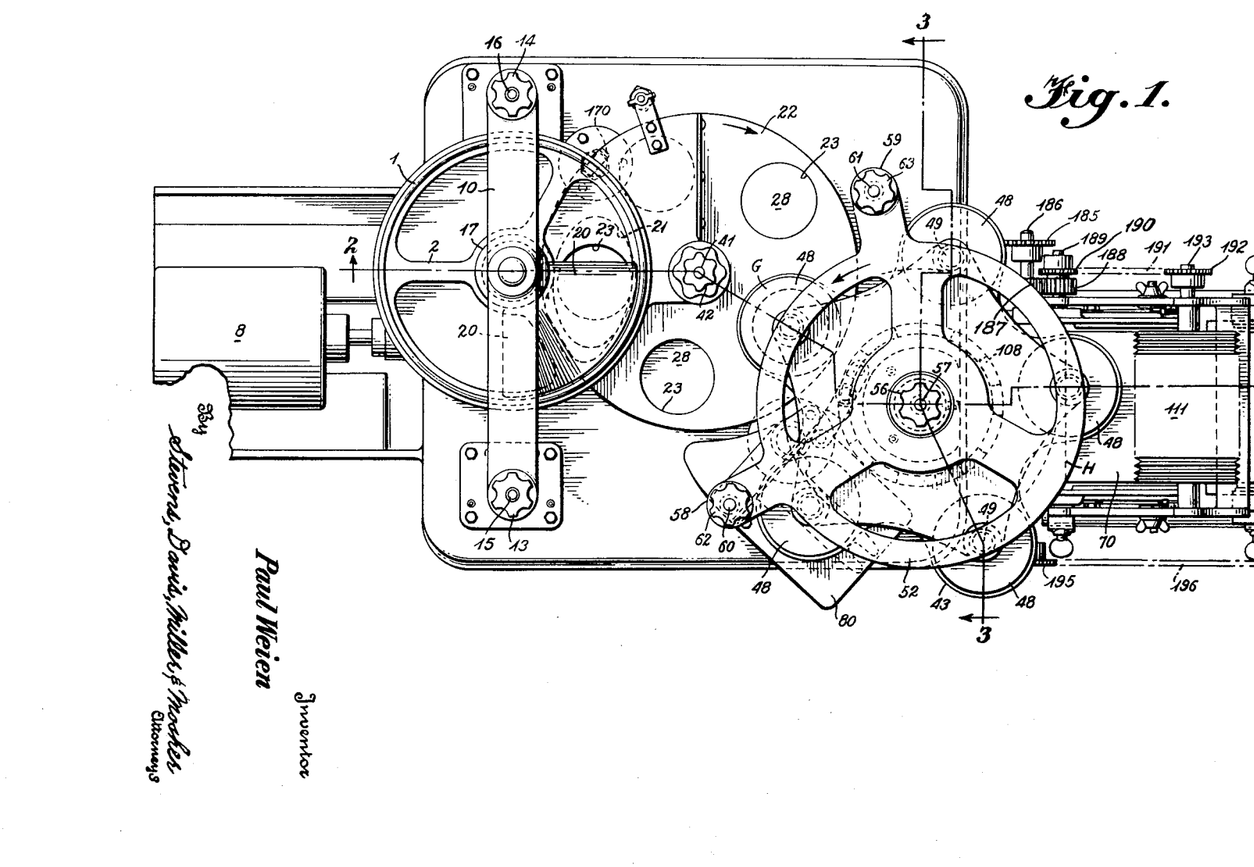
FIGURE 1 is a plan view of a molding machine which is employed with, and operates, the paper dispenser of the present invention.
Figure 2:
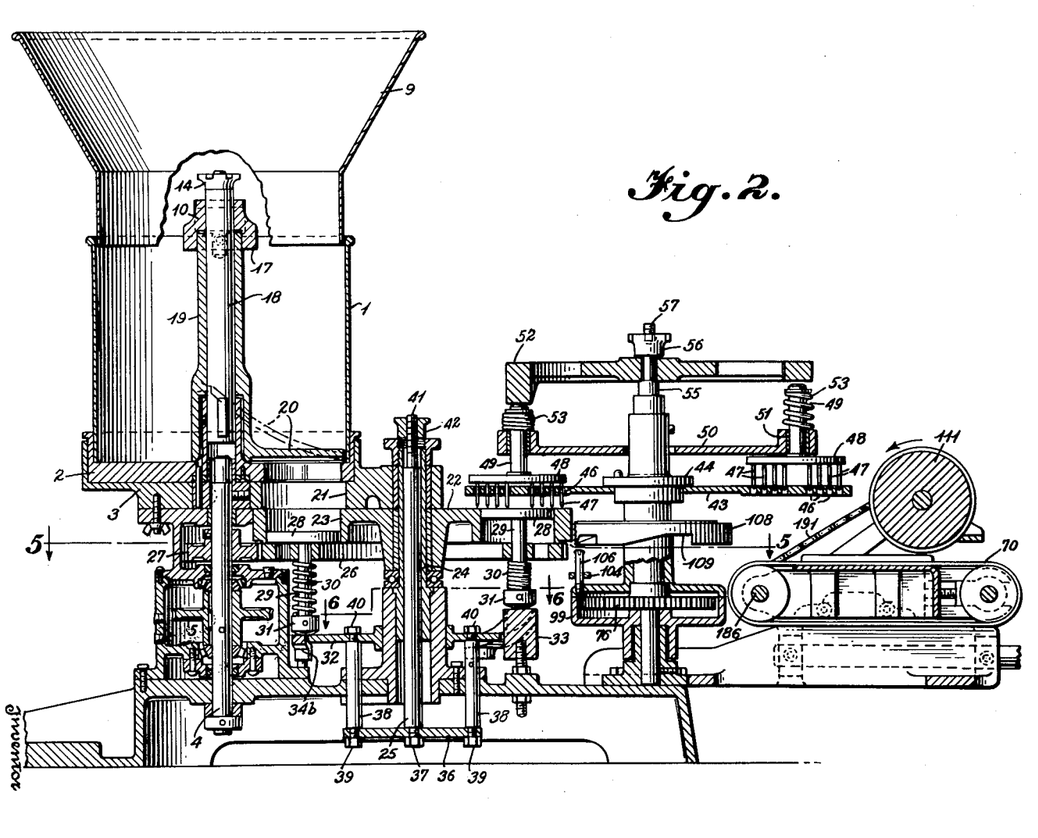
FIGURE 2 is a longitudinal sectional view taken along section line 2—2 of FIGURE 1.
Figure 3:
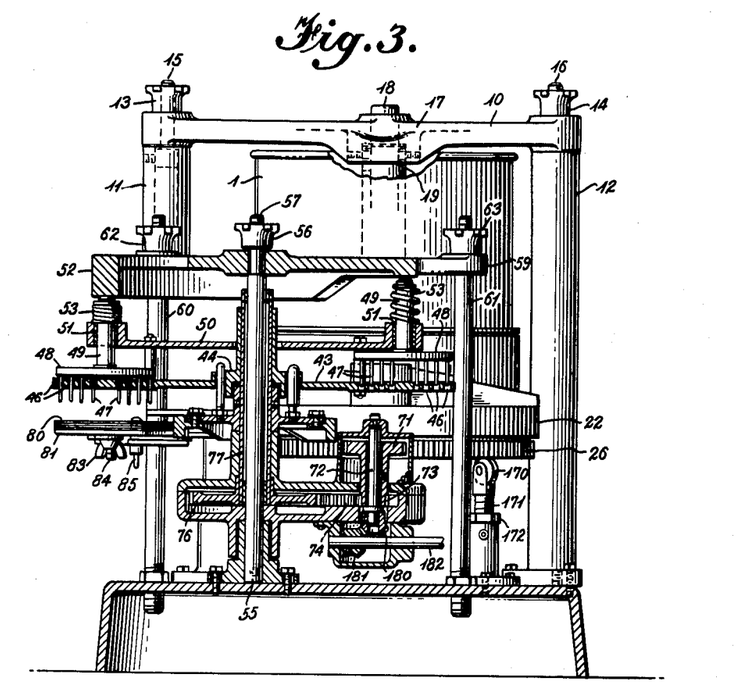
FIGURE 3 is a transverse sectional view taken along section line 3—3 of FIGURE 1, showing the impaling elements and the supporting means therefor.
Figure 4:
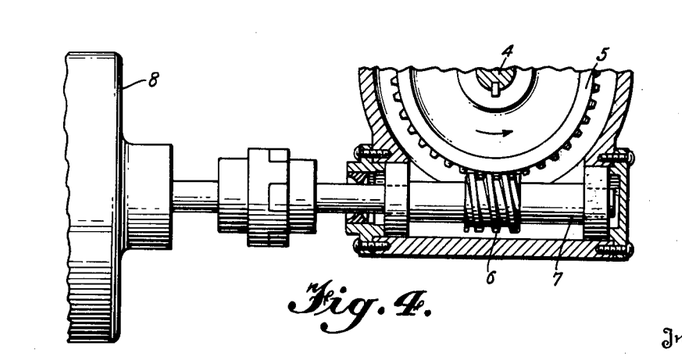
FIGURE 4 is a sectional view, on an enlarged scale, of the drive means for the molding machine.

Referring to the drawings, in detail, in FIGURES 1, 2, and 3 there is shown a rotatable cylindrical hopper 1 which is mounted on a rotatable spider 2 above a fixed base plate 3. The spider 2 is keyed to a vertical shaft 4 which, in turn, is keyed to a worm gear 5. As shown in FIGURE 4, the gear 5 is driven by a worm 6 mounted on a worm shaft 7 which is driven by an electric motor 8. Thus, the hopper 1 together with its spider-shaped base 2 is rotatable relative to the fixed base plate 3.

At the top of the rotatable hopper is a stationary conical hopper 9 which is supported on a horizontal bar 10 extending across the top of the rotatable cylindrical hopper 1. Suitable rectangular openings (not shown) are provided adjacent the bottom portion of the conical hopper 9 so as to engage the bar 10 and prevent rotation of the conical hopper. The ends of the bar 10 are secured to vertical posts 11 and 12 by means of nuts 13 and 14 which are received on threaded rods 15 and 16 passing through suitable holes at the end of the bar 10.

The bar 10 is provided with a central collar portion 17, through which projects an upper vertical extension 18 of the rotatable shaft 4. A stationary sleeve 19 surrounding the shaft 18 is secured at its upper end to the collar 17 of the bar 10. The lower end of the sleeve 19 is provided with a helically shaped blade 20, which is positioned in stationary fashion over a hole 21 provided in the stationary base plate 3. As best shown in FIGURE 1, the stationary blade 20 extends over about 90° of the area of the base plate 3, the upper or leading edge of the blade 20 being located on a line below the bar 10 and the lowermost or trailing edge of the blade 20 being located directly above and towards the rear of the hole 21 in the base plate 3. Thus, if material, such as ground meat, is placed in the rotating cylindrical hopper 1, frictional contact between this material and the hopper will cause the material to pass beneath the blade 20 and into the hole 21 in the base plate 3.

Located to the right of the hopper 1 and below the base plate 3 is a rotatable turntable 22, which is provided with a plurality (five) of vertical and cylindrically shaped holes, all of which are designated by the reference character 23. Turntable 22 is mounted for rotation on a sleeve 24 surrounding the vertical rod 25, the purpose of which will be more fully described hereinafter. A large ring-shaped gear 26 is secured to the underside of the turntable 22. This gear 26 meshes with a spur gear 27, which is keyed to the shaft 4.

In each hole 23 of the turntable 22 there is reciprocably mounted a piston 28. Each piston 28 has a piston rod 29 extending downwardly through a corresponding hole in the gear 26. Surrounding the lower end of the piston rod 29 is a helical spring 30, which bears against the underside of the gear 26 and against enlarged portion 31 on the end of the piston rod 29. The lower end 31 on each piston rod 29 bears against the upper surface of an adjustable cam track (or plate) 32 or against the upper portion of a stationary cam track 33, depending upon the relative rotary position of each piston at any given instance.

Figure 6:
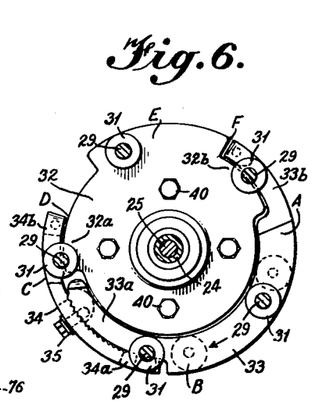
FIGURE 6 is a sectional view taken along section line 6—6 of FIGURE 2, showing the cam means associated with the turntable for forming the patties.
Figure 7:
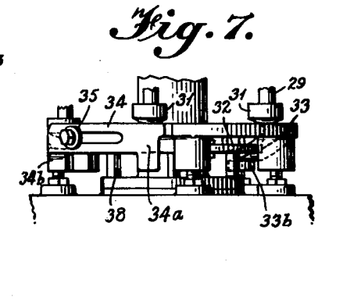
FIGURE 7 is a front elevation of the cam means shown in FIGURE 6.
Figure 7A:
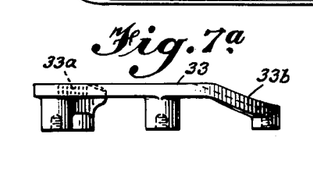
FIGURES 7a and 7b are side elevations, taken at appropriate angles, of the stationary cam track and the adjustable cam segment, respectively, shown in FIGURE 6.
Figure 7B:
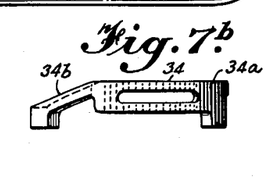

Referring now to FIGURES 2, 6 and 7, the cam track 32, which is adjustable, causes the pistons 28 to assume their lowermost positions as they pass clockwise beneath the hole 21 in the base plate 3 of the hopper. Cam track 33, which is stationary, causes the pistons 28 to be elevated to such an extent that the tops of the pistons are level with the surface of the turntable 22 when the pistons are moved to the position indicated by A in FIGURE 6. In riding over the surface of the cam track 33, the lower ends 31 of the piston rods 29 travel from point A to point B on a substantially level surface such that during this period of movement the tops of the pistons 28 are level with the surface of the turntable 22.

After passing beyond the point B, the piston rods slide over an intermediate cam segment 34 which is adjustably connected to the cam track 33 by means of bolt 35. The cam segment 34 includes a portion 34a which has an upper surface level with the surface of the cam track 33 and a portion 34b which has a sloping surface C. The portion 34a has on its vertical (side) surface, towards the center of the turntable, a series of vertical serrations which are adapted to mesh or mate with complementary serrations on the corresponding adjacent surface of extension 33a of the stationary cam 33. The side of the sloping portion 34b of the cam segment 34 lies along the side of an adjacent inter-fitting portion 32a of the lower adjustable cam 32. The sloping surface C of portion 34b reaches the lower level of cam 32 approximately at point D. The cam 32, forward of point D, extends over a flat uninterrupted portion E to the point F where the cam 32 meets the cam 33. At this juncture, cam 33 is provided with an extension 33b which slopes upwardly from point F, at or below the level of cam 32, to point A at the upper level of the cam 33. Cam 32 is provided with an adjacent interfitting portion 32b which lies along the side of the extension 33b of the stationary cam 33. (All portions of the adjustable cam 32 are at the same level.)

The bolt 35 may be loosened and the cam segment 34 may be moved clockwise or counterclockwise relative to the cams 32 and 33 after which the bolt may be retightened such that the cam segment 34 is secured in a new position. The intermating serrated surfaces on the portions 34a and 33a will hold the cam segment 34 in a plurality of different fixed positions as desired.

From a consideration of FIGURE 6, if the cam segment 34 is advanced in a clockwise direction, it should be apparent that the pistons will commence to descend at a later time with respect to their approach to the hole 21 in the base plate 3. It should be pointed out also that the lower ends of the piston rods are so located, with respect to the overlapping portions of the various cammed members described above, that these rods will ride along the dividing lines between any two overlapping portions. Thus, the piston will slide smoothly in moving from one cammed portion to another, although the uppermost cammed portion will determine the position of the pistons at any given instant.

From a consideration of FIGURES 2 and 7, it should be apparent that the position of the cam 32 will ultimately determine the relative location of each piston 28 within its hole 23 as it rides to its lowermost position beneath the hole 21 in the base plate 3. For the purpose of permitting a variable amount of material to be forced or deposited into each hole 23 above each piston 28, the cam track 32 is adjustable in a vertical direction. The shaft 25, as indicated heretofore, passes downwardly through sleeve 24. At the lowermost end of the rod 25 there is a horizontal plate 36 to which the rod 25 is secured by means of nut 37. A plurality of shorter rods, designated by the reference numeral 38, are secured at their lower ends to the horizontal plates 36 by means of nuts 39. The upper ends of these shorter rods 38 are secured to the cam track 32 by means of nuts 40. The upper end of the rod 25 is threaded, as at 41, and a nut 42 is received on the threaded portion 41. By suitably turning the nut 42 the rod 25 may be raised or lowered such that the cam track 32 will be correspondingly raised or lowered.

Thus, referring to FIGURE 2, if it is desired to effect a smaller volume in the hole 23 above the piston 28 than would be produced from the present relative positions of the elements shown in this figure, the nut 42 can be tightened so as to elevate the rod 25, causing the cam track 32 to be elevated accordingly. Thereafter, when the ends 31 of the piston rods 29 ride on the surface of the cam track 32 beneath the hole 21, the upper ends of the pistons 28 will be in a relatively higher position than as shown in FIGURE 2 and, thus, the quantity of meat or other moldable material that can be placed in the hole 23 will be diminished accordingly. The cam track 33 is not adjustable in the same sense as cam track 32, since the former cam must be so positioned that the upper ends of the pistons 28 will be on a level with the surface of the turntable 22.

As indicated heretofer the cam segment 34 permits a variation in the time when the pistons will commence to descend as they approach the hole 21 in the base plate 3. This action of the pistons is also correlated with the level of the adjustable cam 32. For example, if the position of the adjustable cam 32 is relatively high such that the resulting patty or cake (to be formed in the space 23 above the piston) is relatively thin, then it is desirable to have the cam segment 34 advanced clockwise so as to delay the starting of the downward movement of the piston whereby the time cycle for the filling of the space is reduced to a small interval of time. On the other hand, if the adjustable cam 32 is at or near its lowermost position such that the resulting cake or patty (formed in the space 23) is relatively thick, then the cam segment 34 should be moved counterclockwise so as to start the downward movement of the distance as soon as possible. Thus, for a relatively thick cake or patty, the time for the filling cycle is essentially at a maximum.

Referring again to FIGURES 1, 2 and 3, positioned to the right and slightly above the level of the turntable 22 is a rotatable plate 43 which is connected to a hub portion 44. The driving arrangements for hub 44 and plate 43 will be explained hereinafter. At spaced positions around the circumference of the plate 43 are located a plurality of holes 46. An impaling element 47 is adapted to pass through each one of the holes 46 in the plate 43. Each group of impaling elements 47 is attached to the under side of a disc 48 which is suitably mounted at the lower end of a reciprocable rod 49. For the purpose of illustration, five such discs and rods are shown in the drawings. Another horizontal plate 50 is spaced above the plate 43 for rotation therewith. The plate 50 is provided with suitable holes 51, through which the rods 49 are permitted to reciprocate. Above the plate 50, a stationary and circular cam track 52 is located. The upper ends of the rods 49 are resiliently urged against the lower edges of this cam track by means of springs 53, which bear against the upper ends of the plate 50 and against the upper enlarged ends of the rods 49.

The circular cam track 52 is held in a stationary position at three different points. At its center, the circular cam 52 is secured to a rod 55, which passes through the hub portion 44 of the plate 43; a suitable nut 56 engages the upper threaded portion 57 of this rod 55. At two other positions on the circular cam track 52 there are provided radial extensions 58 and 59 which are secured to vertical posts 60 and 61 by means of threaded nuts 62 and 63, respectively.

As will appear hereinafter, the rotation of the plate 43 is synchronized with the rotation of the turntable 22. At the same time, the configuration of the lower surface of the circular cam 52 is such that the impaling elements 47 and the discs 48 are urged downwardly into position in timed relation with the advance of the pistons 28 on the turntable 22. Thus, when the corresponding pistons 28 and discs 48 reach the position indicated by G in FIGURE 1, the impaling elements 47 will be urged downwardly and into any patty or block of material that happens to be resting on the upper surface of the corresponding pistons 28. Continued rotation of the plate 43 thereafter will slide the patty off the turntable since the patty will now be held on the impaling elements 47.

As shown in FIGURE 3, the right-hand disc 48, with its impaling elements 47, is in its uppermost position. In fact, the bottom of the track 52 is such that, with the disc 48 in its uppermost position under the action of the spring 53, a small amount of clearance is provided between the upper end of the rod 49 and the lower surface of the track. On the other hand, the left-hand disc 48, together with its impaling elements 47, is in its lowermost position such that the disc is almost touching the plate 43. The same conditions hold true with regard to FIGURE 2 in that the right-hand disc 48 is in its uppermost position and the left-hand disc 48 is in its lowermost position.

When each disc 48 is rotated to the position indicated by H in FIGURE 1, the impaling elements 47 and disc 48 are elevated such that the impaling elements 47 are withdrawn upwardly through the holes 46 in the plate 43, causing the meat patty or other piece of moldable material (previously held on these impaling elements) to drop at this particular location. As shown in FIGURE 1, the patties may drop conveniently upon a conveyor belt 70.

Figure 5:
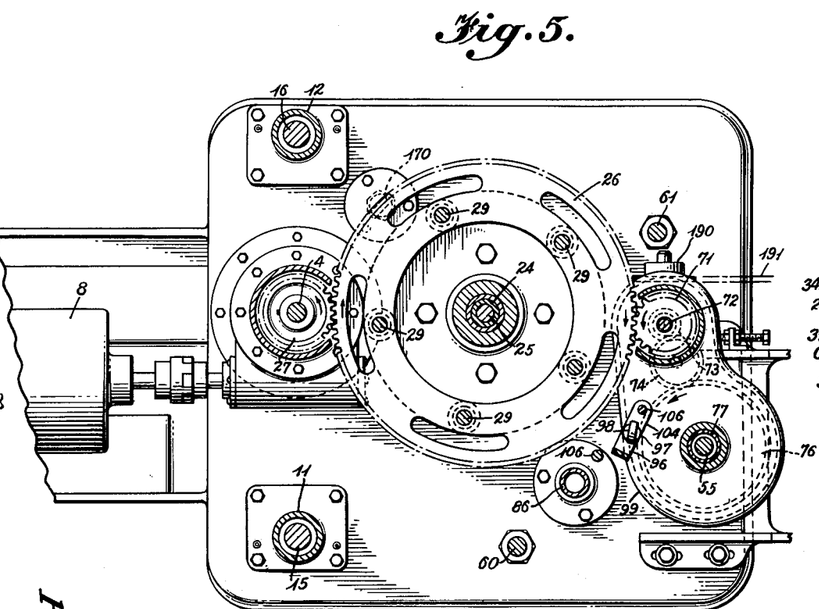
FIGURE 5 is a sectional view taken along section line 5—5 of FIGURE 2, showing the driving relationship between the various rotatable elements of the present invention.

Referring now to FIGURES 2, 3 and 5, means are provided for turning the plate 43 at the same rotary speed as the turntable 22. The gear 26, which is driven by the spur gear 27, also drives another spur gear 71 on the shaft 72. The smaller spur gear 73 is keyed to the shaft 72 below the spur gear 71. Spur gear 73 meshes with an idler gear 74, which in turn meshes with large spur gear 76, which is keyed to the sleeve 77. Sleeve 77 is also keyed to the hub 44 of the plate 43. The relationship between the sizes of the various gears described above is such that the plate 43 will rotate in a counterclockwise direction and at the same rotary speed as the turntable 22.

*The paper dispenser*

Figures 8, 10:
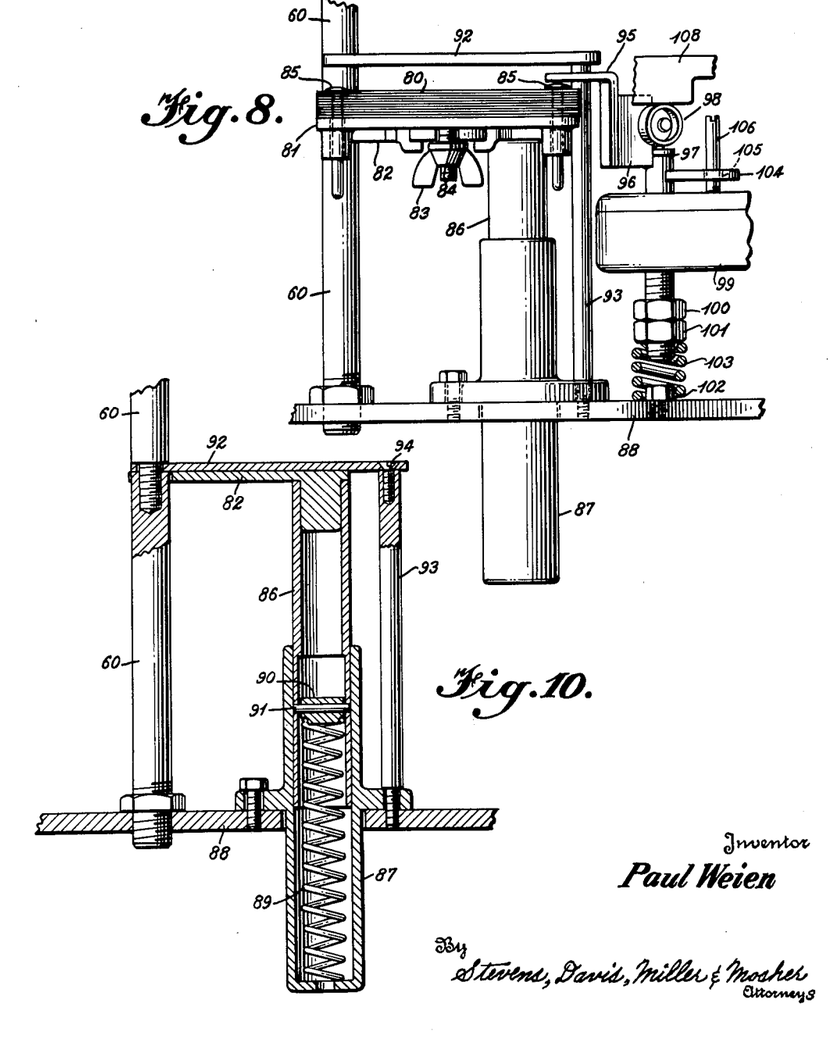
FIGURE 8 is an elevation view, on a slightly enlarged scale, of a paper dispensing means forming one embodiment of the present invention.
FIGURE 10 is a section corresponding to the elevation of FIGURE 8 showing the internal spring mounting for this mechanism.
Figure 9:
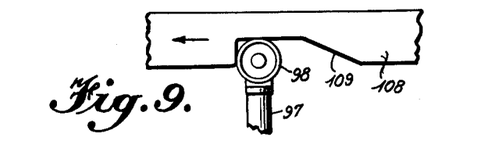
FIGURE 9 is a fragmentary view of the cam means for operating the paper dispenser shown in FIGURE 8.

As shown in FIGURES 1 and 3 and in further detail in FIGURES 8, 9 and 10, the present invention, in particular, provides a means for dispensing small rectangular pieces of paper, these papers being placed beneath the patties as the same are moved from the turntable by the impaling elements towards the conveyor belt 70. The motivating force for carrying the papers from their holder is the force of movement of the patty itself past the block of papers. The block of papers is moved up and down in accordance with the rotation of the plate 43 such that, as each patty is moved from the turntable 22 under the action of the impaling elements 47, the block of papers is moved upwardly against the underside of the patty then passing by. The structure for accomplishing this action comprises a package of papers 80 resting on a flat plate 81. Plate 81 is removably attached to a supporting plate 82 by means of a wing nut 83, which engages a threaded rod 84 attached to the underside of plate 81 and passing through a suitable slot in the plate 82. A pair of pins 85 pass through suitable holes in the paper and in the plate 81 for the purpose of securing the papers 80 in a substantially fixed position relative to the plate 81.

As best shown in FIGURE 10, plate 82 has a tubular extension 86 which is received within the bore of a cylindrical cartridge 87, the latter being secured to a horizontal plate 88 forming a portion of the base structure of the present device. A spring 89 bears against the lower end of the cartridge 87 and, at its upper end, against a plug 90, which is secured within the sleeve 86 by means of a pin 91. Another horizontal plate 92 is secured at one side between two sections of the post 60 and at its other side is secured to a vertical rod 93 by means of a screw 94. The lower end of the rod 93 passes through a suitable hole in the cartridge 87 and engages a hole in the plate 88. It should be apparent that the vertical plate 92 will provide a stop for the upper vertical limit of the horizontal plate 82 in the event that the plate 81 and the papers 80 are not attached to the plate 82.

As shown in FIGURE 8, an arm 95 is located to one side of the pad 80 such that the horizontal portion of this arm bears against the right-hand pin 85. The vertical portion of the arm 95 is provided with a horizontal extension 96 which is attached to a reciprocable rod 97. At the upper end of the rod 97 there is attached a roller 98. The rod 97 passes through suitable holes in an extension of the housing 99. The lower end of the rod 97 is threaded such that two nuts 100 and 101 are received on this threaded end of the rod. A smaller screw 102 is received within a suitable hole in the plate 88 and in a position directly below the end of the rod 97. A spring 103 is received around the lower end of the rod 97 and over the head of the screw 102. Thus, the spring 103 urges the rod 97 in an upward direction. In order to prevent the rod 97 from rotating about its longitudinal axis, there is provided a horizontally projecting tab 104 which is welded at its inner end to the rod 97. The tab 104 is provided with a suitable hole 105 through which passes a guide rod 106. The guide rod 106 is threaded into a suitable hole in the housing 99. The hole 105 is sufficiently large to permit relative vertical movement between the tab 104 and the guide rod 106.

A further circular cam track 108 is secured to the hub portion 44 of the horizontal plate 43 for rotation therewith. The circular cam track 108 is provided with five identically-shaped depressions 109, which permit the roller 98, which is bearing against the under surface of the track 108, to move up abruptly as soon as the patty is passing over the pack of papers 80. As the cam track 108 continues to rotate, the roller 98 will follow the inclined surface of the depression 109 and the pack of papers 80 will be lowered again to the initial position as shown in FIGURE 8.

Figure 11:
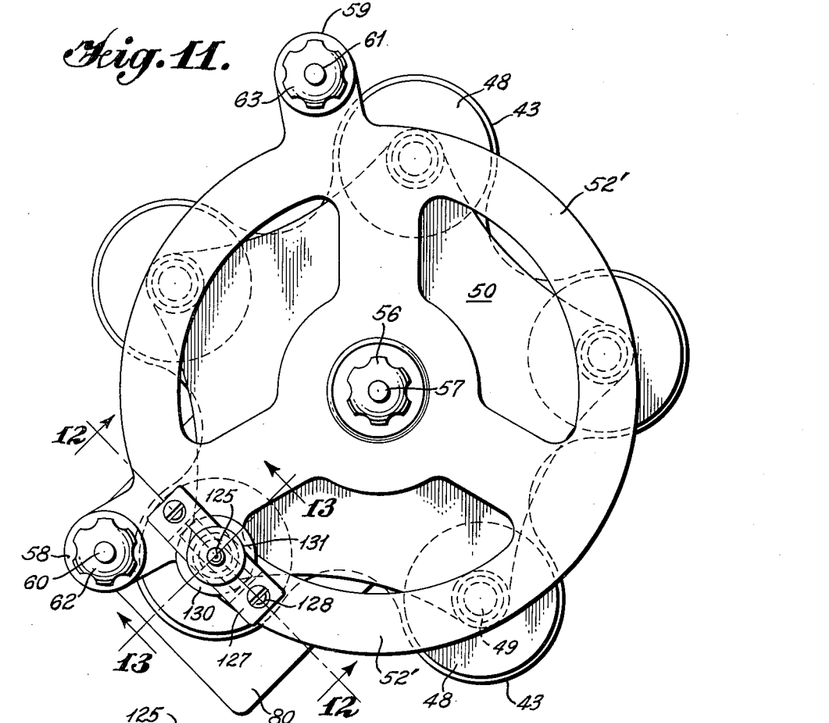
FIGURE 11 is a modified plan view of the circular cam track for the impaling elements, showing another embodiment of a paper dispenser constructed in accordance with the present invention.
Figure 12:
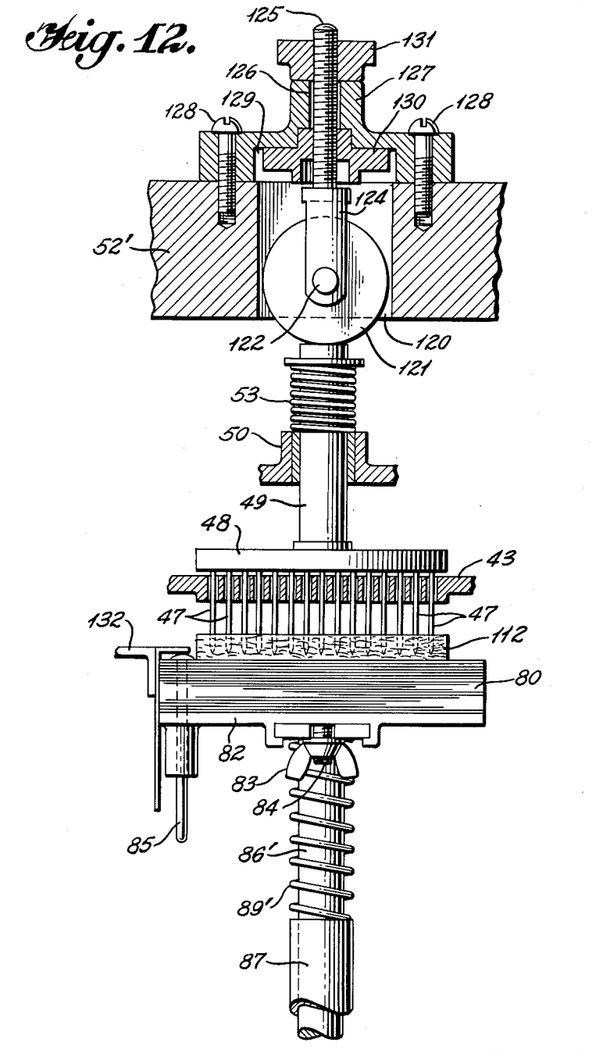
FIGURE 12 is a sectional view taken along section line 12—12 of FIGURE 11.
Figure 13:
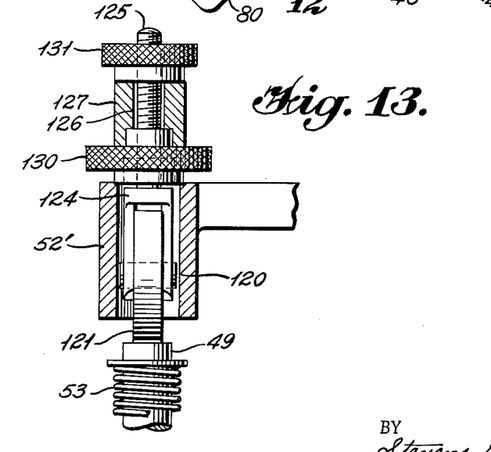
FIGURE 13 is a fragmentary cross-sectional view taken along section line 13—13 of FIGURE 11.

Referring now to FIGURES 11 to 13, there is shown another embodiment of the paper dispenser of the present invention. The cam track 52′ shown in FIGURE 11 is the same as the cam track 52 heretofore described except that the former (52′) is provided with a gap or opening 120 in which is mounted a cam roller 121. The cam roller 121 is provided with an axle 122 which is journalled at its opposite ends in the arms of a roller yoke 124. The upper end of the roller yoke 124 is attached to a threaded rod 125 which passes through a suitable hole 126 in a mounting bracket 127. The mounting bracket is attached to the cam track 52′ at opposite sides of the gap 120 by means of screws 128, 128.

The mounting bracket 127 is provided with a rectangular recess 129 of sufficient size to accommodate for an adjusting wheel or nut 130 which is threadedly received on the rod 125. Thus, the vertical position of the cam roller 121 can be varied by adjustment of the wheel 130. A lock nut 131 is threadedly received on the outer end of the threaded rod 125 for the purpose of holding the rod and roller 121 in a fixed vertical position.

Therefore, as impaling device (with patty thereon) moves in a rotary direction toward the position of the paper dispenser, the upper end of the rod 49 will come into contact with the cam roller 121 so as to lower the disc 48 towards the paper pack 80, thereby urging the patty 112 against the top piece of paper on the pack. It should be noted that spring 89′ provides a resilient mounting for the paper pack such that the latter can be depressed slightly during the period of time that patty is in contact with the pack. The spring 89′ surrounds the extension 86′ and bears against the upper end of the cartridge 87 and the lower surface of the supporting plate 82. As the patty continues to move in a rotary direction, the frictional contact between the patty and the pack will cause the uppermost sheet of paper to be torn or removed from the pack. The piece of paper will adhere to the underside of the patty due to the moisture in the latter as the patty continues to advance in a rotary direction towards its position of discharge over the end of the belt 70. Also, as the patty moves away from the paper pack, the spring 89′ will urge the supporting plate 82 upwardly such that the paper pack will come to rest against the stop 132, the latter being supported from the framework of the machine in any convenient manner.

*Miscellaneous structure*

As shown to the right in FIGURES 1 and 2, the patties, as they are caused to fall due to the elevation of the impaling elements, may be deposited conveniently on a belt 70. The drive for the belt will be discussed hereinafter. As the upper course of the belt 70 moves towards the right, each patty will pass beneath a pattern roll 111. This pattern roll, which is also driven, has a series of circumferential grooves, so as to provide a pattern of that design on the patty that is passing beneath the roller. Alternatively, the pattern roll may have a knurled surface, if desired.

FIGURE 3 shows a roller 170 mounted at the upper end of a vertical threaded rod 171. The threaded rod 171 is positioned by a nut 172 in an upward direction such that the roller 170 bears against the underside of the gear 26 for the purpose of counterbalancing the downward forces that are exerted against the turntable adjacent the bottom of the rotatable hopper 1.

Again in FIGURE 3, the lower end of shaft 72 is keyed to a bevel gear 180. Bevel gear 180, in turn, drives another bevel gear 181 which is keyed to a horizontal shaft 182. A sprocket wheel not shown is keyed to the outer end of the shaft 182 and a chain (not shown) passes around this sprocket wheel and also around sprocket wheel 185 mounted on one end of shaft 186 (see FIGURE 1). A spur gear 187 keyed to the shaft 186 meshes with another spur gear 188 keyed to the shaft 189. A sprocket wheel 190 is also keyed to the outer end of the shaft 189. A chain 191 passes around the sprocket 190 and also around a sprocket 192 which is keyed to one end of a shaft 193. The pattern roller 111 is mounted on the latter shaft.

The interrelationship between the various driving elements described above is such that the pattern roller 111 is driven in the direction indicated by the arrow in FIGURE 2 and at the same peripheral speed as that of the conveyor belt passing beneath. Where the pattern roller is of the type indicated by reference number 111, the thickness of the patty will be decreased and its horizontal dimension will be increased essentially in a longitudinal direction. On the other hand, when a different type of pattern roller is employed, the patty can be flattened in both the longitudinal and transverse directions.

At the opposite end of the shaft 186 from the sprocket 185 there is also keyed a sprocket 195. A chain 196 passes around sprocket 195 and also around another sprocket (not shown) which can be used for driving auxiliary equipment, such as a scoring unit (not shown) or a transfer unit (not shown).

Operation

The operation of the mechanism heretofore described structurally will now be set forth in greater detail. After electrical power has been supplied to the motor 8 for the purpose of causing rotation of the above described elements of the present invention, a quantity of ground meat or other moldable material may be deposited in the rotatable cylindrical hopper 1. The meat or other moldable material may be chilled as desired for optimum molding conditions. As the cylindrical hopper rotates in a counterclockwise direction (referring to FIGURE 1) the material within the hopper will be urged beneath the stationary pitched blade 20 and into the hole 21 in the plate 3. As the turntable 22 rotates in a clockwise direction, and as the holes 23 come into registry with the hole 21 of the stationary plate 3, the pressure against the material in the hopper, due to the frictional contact between the material and the rotating hopper, will force the material into the pocket 23. It should be understood that the material is forced into the pockets 23 in the manner described above without compressing the material to the same degree that this corresponding molding action is accomplished in prior art machines designed for the same purpose. As indicated previously, the depth of this pocket 23 will be determined by the position of the cam track 32, which, in turn, determines the location of the upper surface of the piston 28. As the turntable 22 continues to rotate in a clockwise direction, the pistons 28 will be elevated to the level of the turntable as they pass from beneath the rotating hopper 1.

As the turntable rotates to the position indicated by the reference character G in FIGURE 1, the impaling elements 47 mounted on the disc 48 will descend in synchronism with this movement and impale the patty. The plate 43, upon which all of the impaling elements are mounted, will continue to rotate until, under the action of the cam 52, the impaling elements will be elevated as they approach the position designated by the reference character H and, thereafter, the patty will fall upon the belt 70.

Prior to its discharge onto the belt 70, the patty which is held by the impaling elements will pass over the pack of papers 80. The roller 98, which rides on the under surface of the cam 108, will be urged into the recesses 109 in timed relation with the passage of the patty over the pack of paper 80 so as to cause the pack 80 to be moved upwardly against the under surface of the patty. Frictional contact between the under surface of the patty and the pack of paper 80 will cause the uppermost piece of paper to slide from the pack; the patty, with paper adhering thereto, will be moved to the position where it will be dropped on the belt 70 in the manner described above.

In the embodiment shown in FIGURES 11 to 13, the action is similar to that described above. However, in the prior embodiment, the patty remains substantially in the same plane as it passes over the paper dispenser, the latter being moved towards, and into contact with, the patty. On the other hand, the second embodiment involves a reversal of this motion wherein the paper dispenser is substantially motionless and wherein the patty is moved downwardly towards, and into contact with, the paper pack. Otherwise, the action is very much the same.

Now if desired, the patty may pass along the conveyor belt and under the pattern roll 111. The use of the pattern roller is optional and the same may be employed with or without the paper dispenser, as desired.

Where the present invention has been described in particular relation to the drawings attached hereto, it should be understood that other and further modifications, apart from those shown or suggested herein, might be made within the spirit and scope of this invention.

What is claimed is:

1. A machine for handling patties of foodstuffs comprising in combination means for supplying a succession of individual molded food patties, a plurality of vertically reciprocable patty engaging means mounted for movement along a predetermined path from said supply means, means for moving said engaging means over said predetermined path, paper dispensing means including a resiliently mounted holder for a pack of paper sheets located adjacent and below said path, means located above said paper dispensing means and in said path for urging each of said engaging means as it passes over said dispensing means downwardly towards said support whereby the uppermost sheet of paper in said pack is brought into contact with the patty carried by said engaging means and is thereby slipped from said pack as said patty moves along said path, and means responsive to further movement of said engaging means for releasing said patty with contacting sheet from said patty engaging means.

2. A machine for handling patties of foodstuffs comprising a device for feeding a succession of said patties in spaced relation over a predetermined path and a plurality of individual patty holding means traversing said path, each of said holding means being individually resiliently mounted for limited movement downwardly, a paper dispenser means including a support for holding a pack of papers thereon positioned below and adjacent said predetermined path, means above said support for engaging successively each said individual patty holding means and moving the same downwardly towards said support, whereby the uppermost sheet of paper on said pack of papers is brought into contact with each said patty so that said article slides said uppermost sheet from said pack as said patty is moved along said path.

3. Apparatus for handling articles of foodstuffs comprising means for supplying a succession of individual articles of foodstuff in spaced relation including a plurality of vertically reciprocable impaling means, means to move said impaling means over a predetermined path from said supply means, dispensing means along said path including a holder for a pack of thin flexible sheets, said holder being open at the top to expose the uppermost sheet, cam means for moving said holder and said impaling means relative to each other as each said impaling means passes over said dispensing means, whereby an article of foodstuff on said impaling means is brought into contact with said uppermost sheet and slides the same from said pack, and means responsive to the continued movement of said impaling means along said path for releasing said article with its associated sheet from said impaling means.

4. A machine for handling articles of foodstuffs comprising in combination a plurality of means for holding a succession of individual articles of foodstuff, means for feeding articles of foodstuff singly in spaced relation from a supply source to said holding means, means for moving said holding means over a predetermined path from said feeding means to a discharging means, paper dispensing means including a resiliently mounted holder for a pack of paper sheets located adjacent and below said path, means located above said paper dispensing means and in said path for moving each of said article holding means as it passes over said dispensing means downwardly towards said support whereby the uppermost sheet of paper in said pack is brought into contact with an article of foodstuff on said holding means, and is thereby slipped from said pack as said article moves along said path and means for successively discharging each of said articles and its associated sheet of paper as said holding means moves further along said path.

5. A machine for handling individual portions of foodstuffs comprising in combination a plurality of means for impaling individual portions of foodstuffs, means for moving said impaling means in sequence over a predetermined path from a first station to a second station, means at said first station for impaling a portion of foodstuff upon each impaling means passing thereover, paper dispensing means including a resiliently mounted holder for a pack of paper sheets located adjacent and below said path, means for bringing each impaled portion into contact with the uppermost paper sheet in said pack as each impaling means passes over said dispensing means whereby said uppermost sheet of paper is slipped from said pack as said portion moves along said path, and means at said second station responsive to further movement of said impaling means to release said portion with its associated sheet from said impaling means.

6. A device for placing articles of foodstffs upon a sheet of paper comprising a plurality of individual article holding means for feeding a succession of said articles in spaced relation over a predetermined path and advancing means for moving said article holding means over said predetermined path, a paper dispensing means including a vertically reciprocable support for holding a pack of papers thereon positioned below said predetermined path, cam means actuated by said advancing means in timed relation to the movement of each said article holding means over said support for moving said support upwardly towards said holding means, whereby the uppermost sheet of paper on said pack of papers is brought into contact with an article of foodstuff on said holding means so that said article slides said uppermost sheet from said pack as said article is moved along said path, and means for releasing said article and its associated sheet from said holding means.

References Cited by the Examiner
UNITED STATES PATENTS

| | | |
|---|---|---|
| 1,440,856 | 1/1923 | Westcott. |
| 2,010,524 | 8/1935 | McClatchie _________ 53—123 X |
| 2,684,501 | 7/1954 | Holly _____________ 53—157 X |
| 2,814,921 | 12/1957 | Beerend ___________ 53—122 |

FRANK E. BAILEY, *Primary Examiner.*

BERNARD STICKNEY, *Examiner.*